N. LOSEY.
ARTIFICIAL LIGHT DIFFUSING APPARATUS.
APPLICATION FILED JUNE 21, 1909.
999,813.
Patented Aug. 8, 1911.
2 SHEETS—SHEET 1.
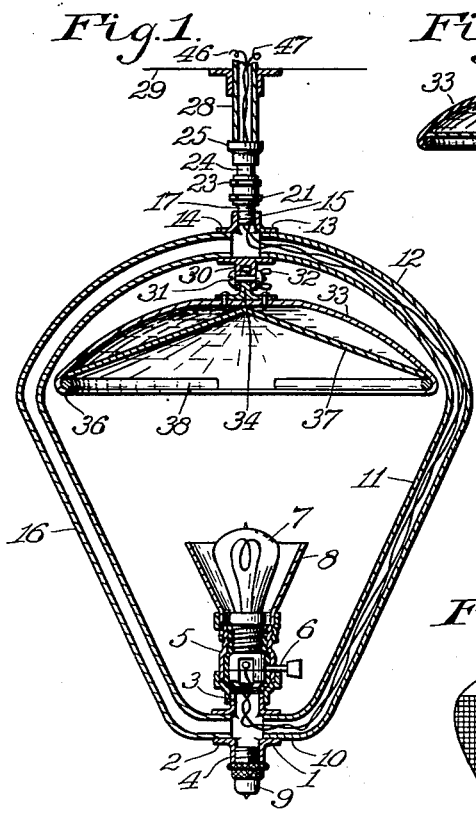
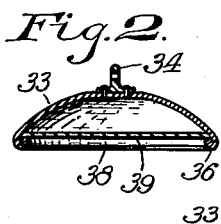
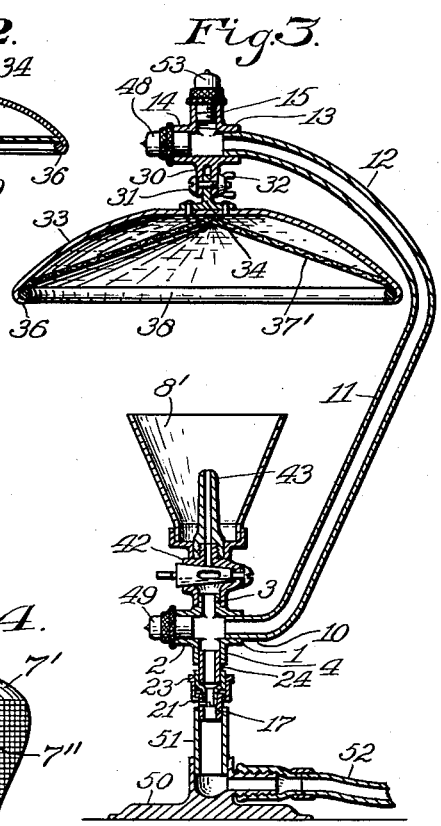
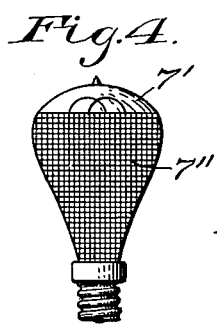
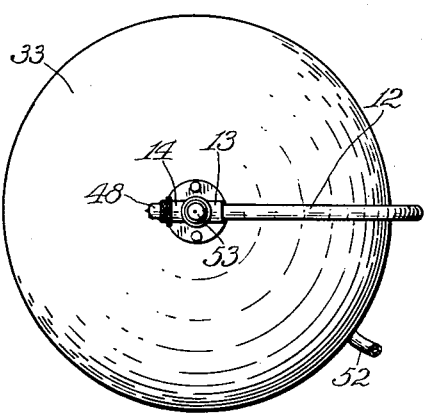
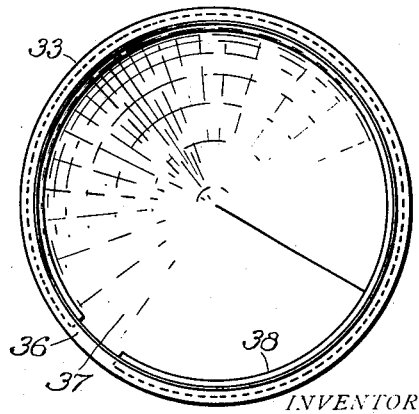
WITNESSES:
J. H. Gardner
K. R. Woddell
INVENTOR:
North Losey,
BY
E. T. Silvius,
ATTORNEY.

N. LOSEY.
ARTIFICIAL LIGHT DIFFUSING APPARATUS.
APPLICATION FILED JUNE 21, 1909.
999,813.
Patented Aug. 8, 1911.
2 SHEETS—SHEET 2.
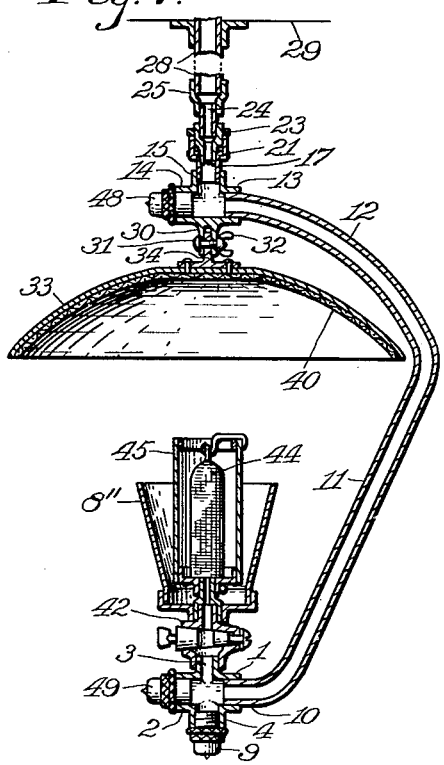
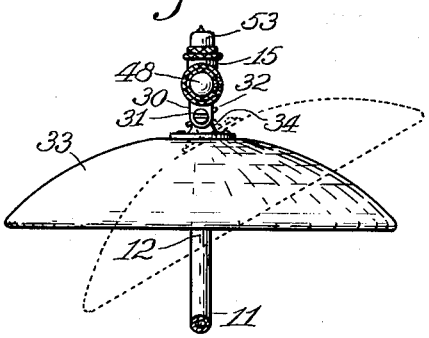
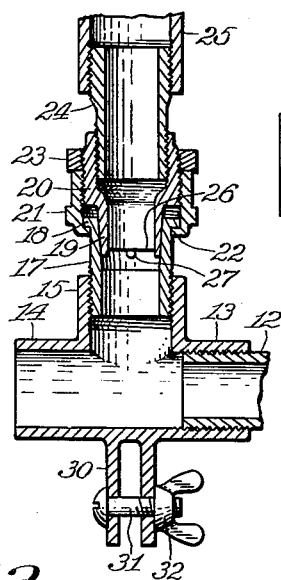
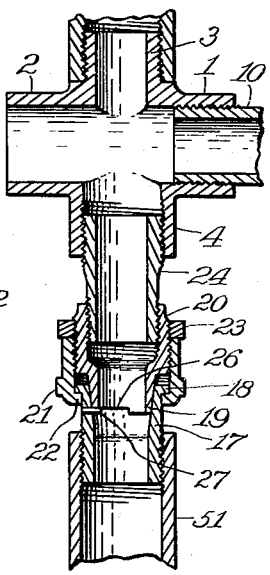
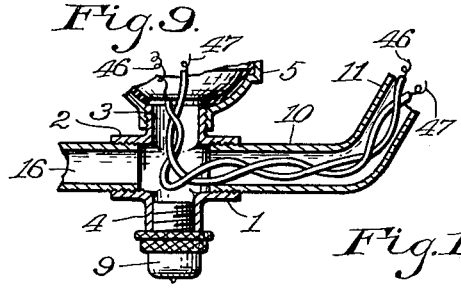
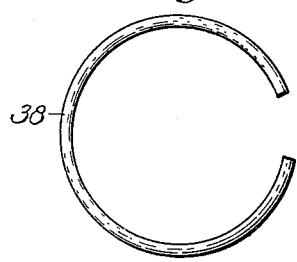
WITNESSES:
J. H. Gardner
K. R. Woddell
INVENTOR:
North Losey,
BY
E. T. Silvius,
ATTORNEY.

UNITED STATES PATENT OFFICE.

NORTH LOSEY, OF INDIANAPOLIS, INDIANA.

ARTIFICIAL-LIGHT-DIFFUSING APPARATUS.

999,813.  Specification of Letters Patent.  Patented Aug. 8, 1911.

Application filed June 21, 1909. Serial No. 503,377.

*To all whom it may concern:*

Be it known that I, NORTH LOSEY, a citizen of the United States, residing at Indianapolis, in the county of Marion and State of Indiana, have invented certain new and useful Improvements in Artificial-Light-Diffusing Apparatus; and I do declare the following to be a full, clear, and exact description of the invention, reference being had to the accompanying drawings, and to the letters and figures of reference marked thereon, which form a part of this specification.

This invention relates to lamps and appurtenances thereof that are adapted to produce indirect artificial light by which to work or read, and that will be adapted for use for illumination generally, and especially in apartments; the object of the invention being to provide an improved lamp or light producing apparatus that may be used without injury to the eyes that is common with the use of direct rays of light from lamps upon objects before the eyes or directly to the eyes.

In Patent No. 823,542, granted to me June 1, 1909, is shown a light diffusing apparatus comprising a focusing or concentrating reflector behind which a photographic subject may be placed and shielded from the direct rays of light, and a relatively large diffusing reflector whereby the light may be diffused and reflected beyond and around the focusing reflector onto the subject, and the purpose of the present invention is to provide improved light diffusing apparatus that will be adapted especially for domestic use when it is most convenient and desirable that the source of light be arranged above the person or persons using it, so that the direct rays of light may be excluded from the eye by means of the focusing deflector, the aim being to reflect the light upward to a diffusing reflector that will be adapted to reflect the light downward beyond and below the lamp and without material loss of strength of light.

With the above-mentioned and other objects in view the invention consists in improved light diffusing apparatus comprising a focusing or concentrating reflector provided with supporting means for maintaining it with its axis approximately vertical, a diffusing reflector mounted on the supporting means above and opposite the focusing or concentrating reflector, and a lamp-burner supported within the focusing or condensing reflector; and the invention consists further and specifically in the novel parts and combinations and arrangements of parts as hereinafter particularly described and then defined in the appended claims.

Referring to the drawings Figure 1 is a vertical central sectional view of a hanging-lamp constructed substantially in accordance with the invention, with the use of an electric lamp; Fig. 2, a sectional view of a modified form of diffusing reflector; Fig. 3, a stand-lamp for gas-light constructed substantially in accordance with the invention; Fig. 4, an elevation of an incandescent electric lamp having the bulb thereof adapted to serve as the focusing or concentrating reflector; Fig. 5, a top plan of the stand-lamp; Fig. 6, an inverted plan of the preferred form of diffusing reflector; Fig. 7, a vertical sectional view of a modified form of hanging lamp for incandescent gas light; Fig. 8, an elevation of the diffusing reflector; Fig. 9, a fragmentary detail of the electric-lamp on an enlarged scale; Fig. 10, a vertical central sectional view showing portions of the support whereby the reflectors are maintained in proper relation one to another; Fig. 11, a vertical sectional view showing parts of the preceding figure in different relations, for use in a stand-lamp construction; Fig. 12, a plan of a clamp ring comprising a part of the apparatus in one of its specific forms of construction; and Fig. 13, a perspective view of a modified form of diffusing reflector.

Similar reference characters in the different figures of the drawings indicate like elements or features of construction referred to herein.

The connecting and supporting means for the two opposed reflectors and the lamp or light producing element comprises a pipe-cross having two branches 1 and 2 in horizontal alinement and two branches 3 and 4 in vertical alinement, the branch 3 supporting a suitable electric switch-box 5 or similar device provided with a lamp-socket and also a key 6 of the usual construction, an electric lamp 7 being mounted in the socket, the switch box suitably supporting a focusing or concentrating reflector 8 that extends about the lamp and upward approximately to the top of the lamp and so as to reflect the light of the lamp directly upward.

In the hanging-lamp construction the branch 4 is closed by an ornament 9, and the branch 1 has an end portion 10 of a tube attached thereto, the tube having an upward extending portion 11 which preferably is straight, and having also a curved portion 12 extending from the upper end of the portion 11. A pipe-T having two branches 13 and 14 in horizontal alinement and an upward extending branch 15 is arranged at a suitable distance above the lamp and has its branch 13 attached to the end of the portion 12 of the tube, said tube constituting an arm for connecting the diffusing reflector with the lamp and the focusing or concentrating reflector, and serving also to incase the electric wiring, as will further appear. A hollow arm 16 which preferably is shaped similarly to the other arm has one of its ends connected to the branch 2 and its other end connected to the branch 14, in relatively heavy apparatus. A nipple 17 comprising one part of a swivel-joint is attached to the branch 15 and has an external flange 18 on its upper end. A tube 19 is swiveled in the upper end of the nipple 17 and has an enlarged upper end 20 on which is a nut 21 that has an external flange 22 engaging the under side of the flange 18, the nut being adjusted so as to permit rotation of the tube 19 but preventing disconnection thereof from the nipple, there being a lock-nut 23 also on the enlarged portion 20 that is forced against the nut to prevent the nut from accidentally turning on the tube. A nipple 24 is attached to the enlarged portion 20 of the tube and is connected to the pipe coupling 25 in the hanging lamp construction or to the branch 4 of the pipe cross in the stand lamp. The lower end of the tube 19 has a recess 26 in the end of the wall thereof, so that a stop-pin 27 which is inserted in the wall of the nipple 17 extends in the recess and limits the amount of rotation of the nipple 17 and tube 19 either with respect to the other, by reason of the pin engaging the wall at either end of the recess 26. In the relative arrangement of the swivel-joint it will be understood that if desired the devices may be relatively inverted with the nipple 24 lowermost and the nipple 17 uppermost, the terminal ends of the two nipples being identically formed. In the hanging lamp construction the pipe coupling 25 is attached to a drop-pipe 28 that extends down from the ceiling 29 of the room or apartment.

The pipe-T has a jaw 30 on the under side thereof that is provided with a clamp-bolt 31 which has a binding-nut 32 thereon whereby the two wings of the jaw may be drawn together slightly. A reflector frame 33 is provided with a projection 34 having a bolt-hole 35 therein, the projection extending between the two wings of the jaw 30 and the hole receiving the bolt 31 whereby the frame may be securely clamped adjustably to the jaw. The reflector frame is preferably composed of sheet metal and concavo-convex, the concave side being presented toward the focusing reflector, and it is suitably adapted in some cases to serve as the diffusing reflector, but preferably it has an inwardly turned lower edge 36 and is provided with a separate removable diffusing reflector 37 which is inserted in the frame and normally held therein by a spring-ring 38 placed against the under side of the reflector and resting on the inwardly turned edge 36, the reflector 37 being composed of suitable material, preferably of white "blotting" paper, or a diffusing reflector 37' may be composed of white fibrous substance, such as asbestos, especially when used with gas light. The reflecting medium 37 and 37' are preferably cut from sheet material in the shape of a disk from which a V-shaped section is then cut from one side portion thereof so that it may be formed into conical shape by hand and readily placed in position in the frame. In some cases, however, a plain disk shaped reflector 39 may be employed, as in Fig. 2, or if preferred a concavo-convex reflector 40 may be formed to correspond to the shape of the frame 33 and suitably secured to the under side thereof. In lieu of the plain electric lamp 7 and separate focusing reflector 8 the lamp 7' may be employed that has reflecting material 7'' thereon that serves to focus the light onto the diffusing reflector and to also shade the light from the space below and around the lamp. In some cases also a disk shaped diffusing reflector 41 may be used when it may be desired to diffuse the light over considerable area, as when it is not convenient to support the lamp at sufficient height for reflecting the light over the desired area with the concave reflector.

When it is preferred to produce gas light instead of electric light a gas-cock 42 is connected to the branch 3 instead of connecting the switch-box 5 thereto, and a gas-burner 43 is connected with the gas-cock, a focusing reflector 8' being mounted so as to extend about and upward beyond the burner, so as to reflect the light upward onto the diffusing reflector. In some cases also the gas lamp may be provided with a mantle 44 and chimney 45, in which case a focusing reflector 8'' is employed that extends about the chimney so as to reflect the incandescent light upward to the diffusing reflector. In the electric lamps the circuit wires 46 and 47 extend as usual through the drop pipe 28 and down through the swivel joint, and thence through either one of the arms into the switch-box 5, in which provision is made as usual for connecting the lamp therewith; either one or both of said arms being adapted to conduct gas to the gas burner when gas light is desired. In some cases the arm 16 may be dispensed with, in which case the branch 14 is closed by an ornament 48 and the branch 2 is closed by an ornament 49.

In the stand lamp construction a base 50 is employed having a hollow column 51 thereon to the top of which the nipple 17 is connected, a gas conducting tube 52 being connected with the column as usual, and instead of connecting the nipple 17 to the branch 15 the branch is closed by an ornament 53. If it is desired to produce an electric stand lamp the circuit wires obviously may extend through the column 51 to the lamp proper.

In practical use the focusing or concentrating reflector will reflect the light upward about a vertical axis and against the substantially horizontal diffusing reflector which will reflect and diffuse the light downward and outward; and if it be desired to reflect the light at an inclined angle the binding-nut 32 may be loosened and the diffusing reflector may be tilted as may be desired, and then secured by tightening the binding-nut. If the light is not then reflected in the desired direction the arm which connects the two reflectors may then be turned on its swivel joint until the desired result is obtained.

Having thus described the invention, what is claimed as new, is—

1. Light-diffusing apparatus including a hollow supporting device, a hollow curved supporting arm connected with the supporting device and supported uprightly thereby, a focusing-reflector mounted on the lower end portion of the arm, a lamp-element in the focusing-reflector to be supplied with energizing medium through the device, and a diffusing-reflector mounted on the upper end portion of the arm opposite the focusing-reflector.

2. Light-diffusing apparatus including a hollow supporting device, a hollow curved supporting arm connected with the supporting device and supported uprightly thereby, a focusing-reflector mounted on the lower end portion of the arm, a lamp-element in the focusing-reflector to be supplied with energizing medium through the device and the arm, a diffusing-reflector, and means for adjustably connecting the diffusing-reflector to the upper end portion of the arm opposite the focusing-reflector.

3. Light-diffusing apparatus including a substantially upright curved supporting arm having a downward-projecting jaw on the upper end portion thereof, a clamp-bolt connected to the jaw, a diffusing-reflector having an apertured projection thereon engaged by the jaw and the clamp-bolt, a focusing reflector mounted on the lower end portion of the arm opposite the diffusing-reflector, and a source of light in the focusing-reflector.

4. Light-diffusing apparatus including a supporting arm having a swivel-joint on one end portion thereof, the upper end portion of the arm having a jaw thereon, a clamp-bolt connected to the jaw, means connected with the swivel-joint for supporting the arm, a source of light mounted on the lower portion of the arm, a reflector mounted on the lower portion of the arm and extending under and about the source of light, and a diffusing reflector having an apertured projection thereon engaged by the jaw and the clamp-bolt.

5. Light-diffusing apparatus including a hollow supporting arm having a hollow swivel-joint on one end portion thereof, means connected with the swivel-joint for supporting the arm in substantially upright position, a focusing-reflector mounted on the lower end portion of the arm, a lamp-element in the focusing-reflector to be supplied with energizing medium through the swivel-joint and the arm, and a diffusing-reflector mounted on the upper portion of the arm opposite the focusing-reflector.

In testimony whereof, I affix my signature in presence of two witnesses.

NORTH LOSEY.

Witnesses:
 E. T. SILVIUS,
 K. R. WODDELL.